Feb. 18, 1930. L. NAGY 1,747,525
ATTACHMENT TO SEEDING MACHINES
Filed May 23, 1927 3 Sheets-Sheet 3
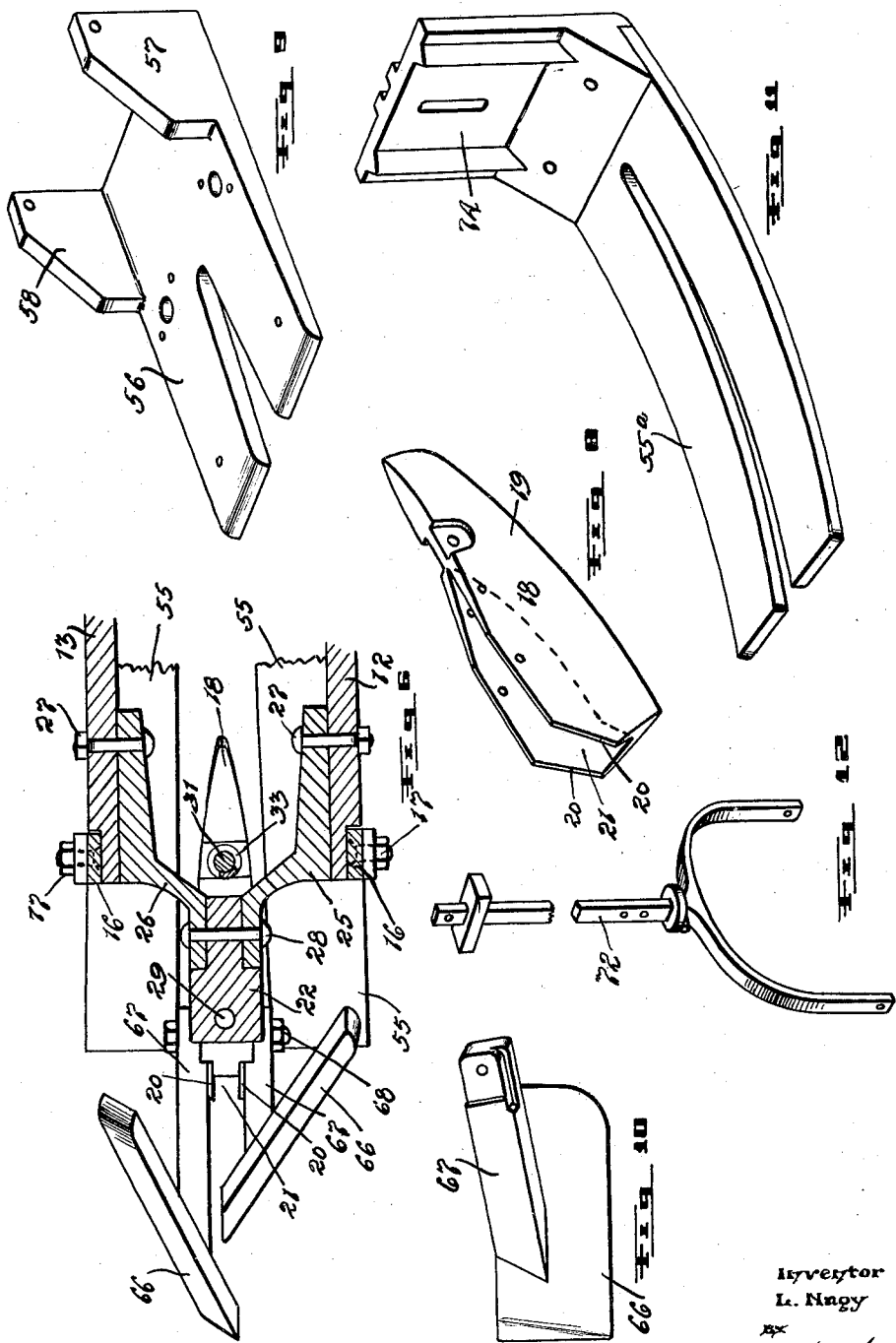
Inventor
L. Nagy Patented Feb. 18, 1930

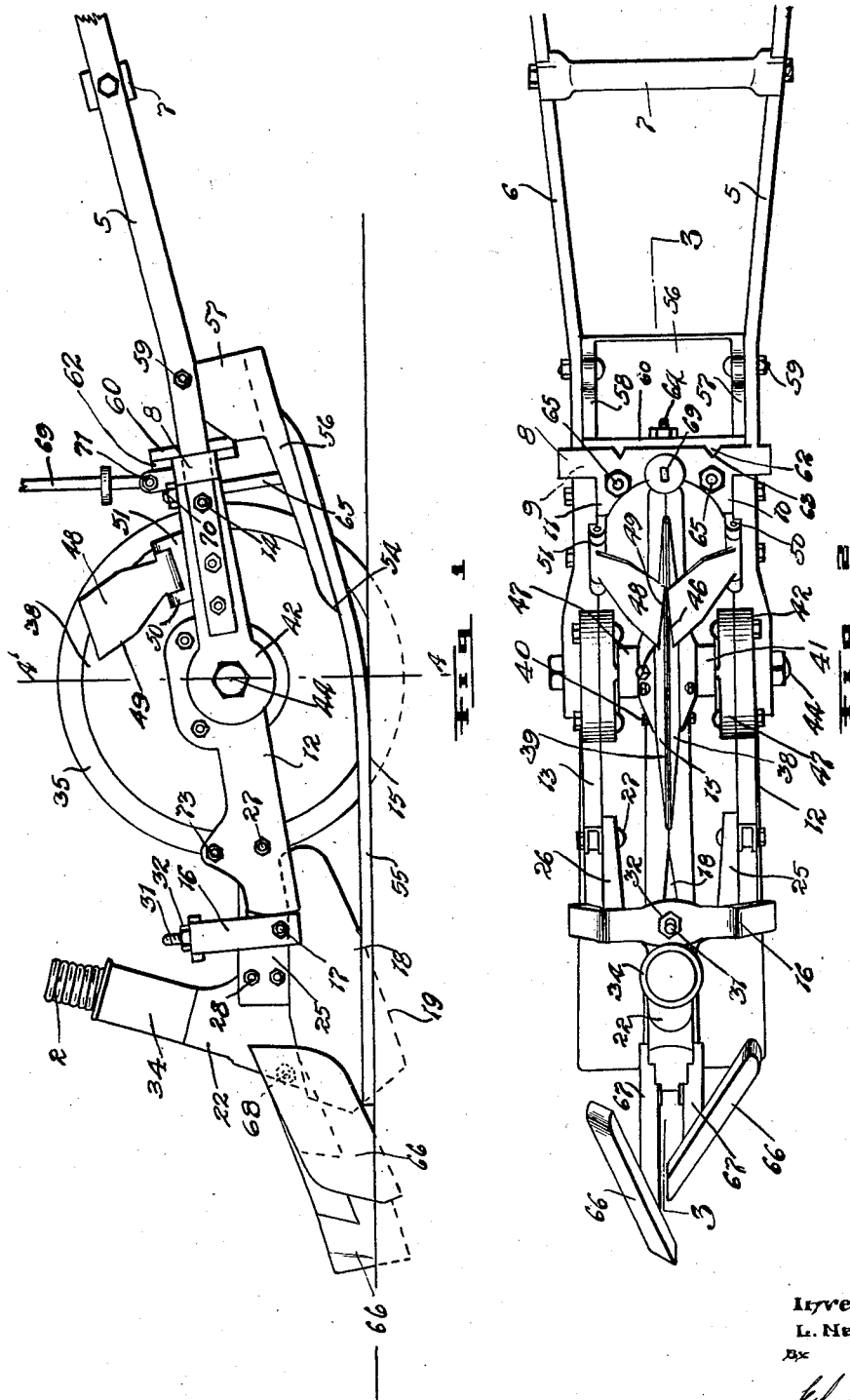

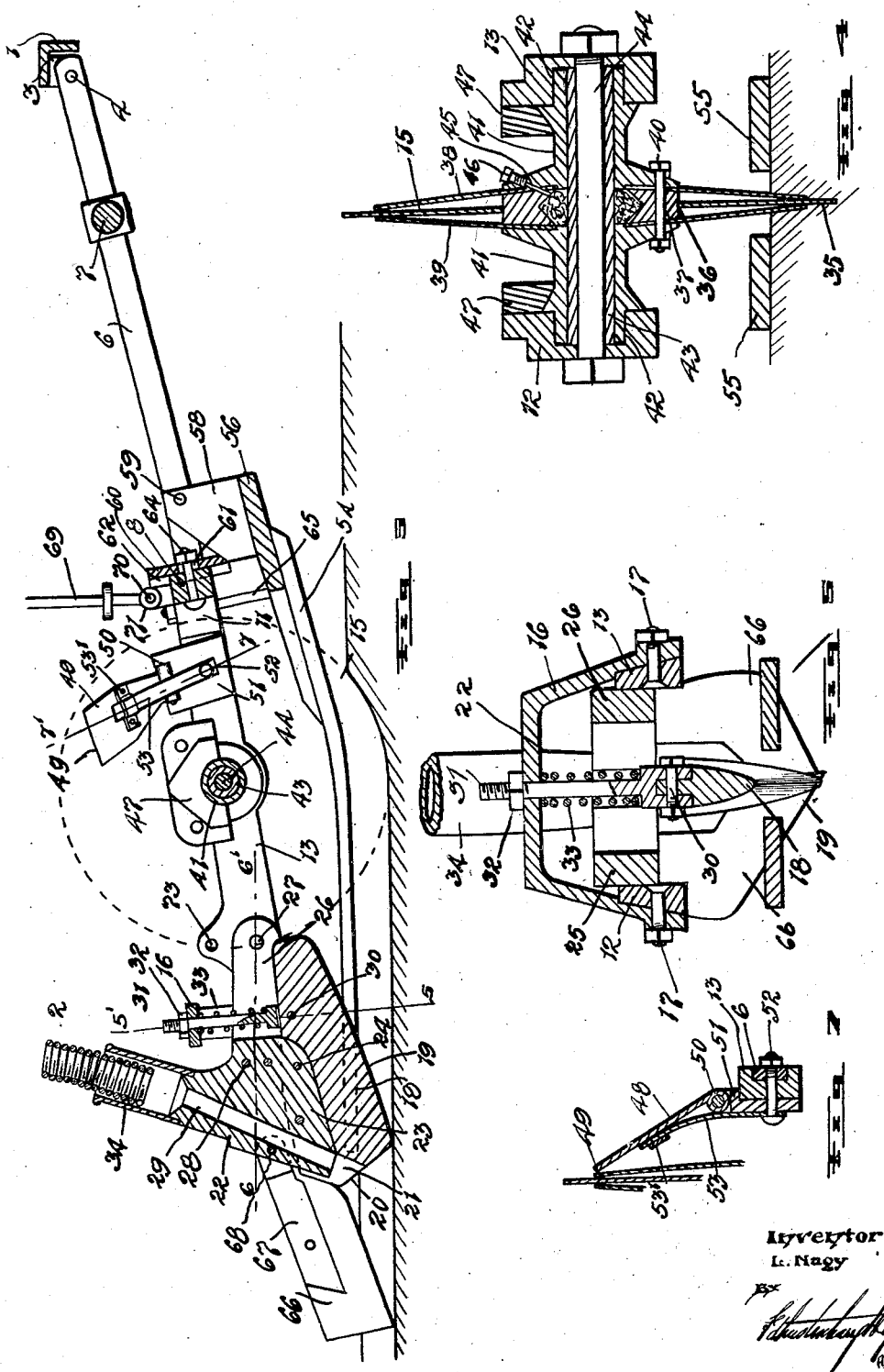

1,747,525

UNITED STATES PATENT OFFICE

LOUIS NAGY, OF HAZEL CLIFFE, SASKATCHEWAN, CANADA

ATTACHMENT TO SEEDING MACHINES

Application filed May 23, 1927. Serial No. 193,570.

The invention relates to improvements in attachments to seeding machines and an object of the invention is to provide an attachment to a seeding machine which will effectively cut weeds, roots and similar ground obstructions and will form a furrow in the ground for the seed and is arranged such that it will not drag weeds or other loose surface material or become clogged by the same.

A further object of the invention is to construct the device so that it can be readily set to form the furrow at predetermined depths and such that the depth of the furrow formed can be readily controlled by the operator.

A further object is to construct the machine having the furrow forming shoe thereof arranged so that it can readily rise to pass a ground obstruction such as a stone and associated with the shoe a disc positioned in advance thereof, the disc being freely rotatable and having the bearings thereof dust proof and effectively oiled.

A further object is to associate with the disc, scrapers for cleaning the same.

A still further object is to construct the attachment so that a number of them will at all times sow the seed in evenly spaced furrows and further to associate with the shoe, pivoted shares which will effectively close the furrow after the seed has been sown.

With the above more important and other minor objects in view which will become more apparent as the description proceeds, the invention consists essentially in the arrangement and construction of parts hereinafter more partitcularly described, reference being had to the accompanying drawings, in which:—

Fig. 1 is a side view of the attachment.

Fig. 2 is a plan view thereof.

Fig. 3 is a vertical sectional view at 3—3' Figure 2.

Fig. 4 is a vertical cross sectional view at 4—4' Figure 1.

Fig. 5 is an enlarged detailed vertical sectional view at 5—5' Figure 3.

Fig. 6 is an enlarged detailed horizontal sectional view at 6—6' Figure 3.

Fig. 7 is an enlarged detailed sectional view at 7—7' Figure 3.

Fig. 8 is a perspective view of the shoe.

Fig. 9 is a perspective view of the foot plate.

Fig. 10 is a perspective view of one of the shares.

Fig. 11 is a perspective view of an alternative form of foot.

Fig. 12 is a perspective view of a modified form of pressure rod.

In the drawings like characters of reference indicate corresponding parts in the several figures.

The device herein shown is designed for use in connection with the customary seeding machine frame and seed box and as such parts form no part of the present invention, they are not herein shown in detail. Further I have simply herein shown and described one attachment but it is to be understood that a plurality of such devices will be used on a machine arranged side by side and all connected pivotally forwardly to the machine frame and all receiving the grain fed from the seed box.

The forward bar of the machine frame is indicated at 1 Figure 3 and a flexible feed tube for the grain coming from the feed box is indicated at 2. The bar 1 is provided with suitably spaced lugs 3 and to pairs of lugs I pivotally connect by bolts 4, the forward ends of a pair of draw bars 5 and 6, the draw bars having their forward ends diverging forwardly and their rear ends spaced a predetermined distance apart and parallel. A brace 7 extends between and is secured to the forward ends of the draw bars.

A head block 8 is provided and has the ends thereof slotted as indicated at 9 to receive the draw bars which extend to the rear thereof and the head is provided with a pair of spaced lugs 10 and 11 against which I butt the forward ends of a pair of similar, right and left, side bars 12 and 13, the side bars being fastened to the lugs by bolts 14 and being lengthwise channelled in their outer faces to receive the rear going ends of the draw bars. The bolts pass also through the draw bars and effectively fasten the draw bars to the side bars. In a central location between the side bars, I mount rotatably a rotary cutting disc 15, the details of which and parts associated therewith are later described.

The rear ends of the side bars are connected by a bail bar 16 which has the ends thereof pivotally fastened by bolts 17 to the side bars. The shoe 18 which follows the disc is of the shape best shown in Figure 1 and is substantially V or wedge shaped in vertical cross section and has the lower or ground edge thereof 19 curving gradually upwardly from the rear to the front. The rear end of the shoe terminates in a pair of wings 20 between which is located the feed channel 21 for the grain fed to the shoe from the tubular boot 22. The lower end of the boot is provided at the under side with a web 23 which is received within a top channel in the shoe and bolts 24 pass through the web and shoe and effectively secure such parts together.

A pair of similar right and left swinging arms 25 and 26 are pivotally fastened to the side bars by bolts 27, these bolts being in advance of the bolts 17 and the rear ends of the swinging arms are permanently fastened to the forward side of the boot by bolts 28. The seed passage 29 through the boot communicates with the passage located between the wings of the shoe as best shown in Figure 3. To the forward end of the shoe I attach pivotally by a pin 30, the forked lower end of an upwardly extending bolt 31 and the bolt has the upper end thereof screw threaded and passing slidably through the bail bar and provided there above with an adjusting nut 32. A coiled spring 33 is mounted on the bolt between the shoe and the bail bar.

According to this latter arrangement, the shoe is continuously pressed towards the soil by the action of the spring but should it strike a ground obstruction such as a stone, the shoe can swing upwardly turning on the bolts 27 to permit it to pass over the obstruction without harming the lower edge 19 thereof. The down pressure on the shoe can be adjusted as experience dictates by tightening or loosening the nut 32 which will increase or decrease the tension in the spring. The upper end of the boot receives frictionally a short tube 34 and the flexible feed tube 2 enters said tube 34 so that the grain fed from the grain box as previously mentioned is delivered to be ground at the rear end of the shoe.

I have herein shown the disc as specially made and mounted. The disc is constructed from a central circular plate 35 having a comparatively large central opening 36 therein and the edge thereof sharpened. In the opening of the plate I locate a collar 37 which extends beyond the sides of the plate. I provide also two similar right and left dished plates 38 and 39 which have a diameter somewhat less than the diameter of the central plate and are placed against the opposite sides of the central plate and butt the ends of the collar to which they are fastened by bolts 40, it being observed that the dished plates have an open centre registering with the open centre of the collar.

This arrangement provides a particularly light yet strong disc and permits of the ready substitution of a new central plate when the same becomes worn out through continued use. Whilst I have described the disc structure, however, in detail, it will be readily understood I do not wish to be limited to a disc made in this particular way as various other disc structures could be employed without departing from the spirit of the invention.

To each side of the disc I secure a sleeve 41 of predetermined length and diameter, one end of the sleeve entering the central opening in the dished plates and the other end of the sleeve entering rotatably a bearing 42 formed in the adjacent side bar. The sleeve is provided adjoining the inner face of the side bar with an extending tapering flange and at the side next the disc with a flange which butts the disc and is actually fastened to the disc by the bolts 40 previously described. The sleeves are rotatably mounted on a tubular shaft 43 which has the ends butting the side bars and through the shaft I pass a bolt 44 carried by the side bars and having one end provided with a head and the other end supplied with a nut. Upon the nut being tightened up, the tubular shaft is effectively jammed between the side bars and is accordingly held stationary whilst the sleeves of the disc are free to rotate there around.

By observing Figure 4, it will be seen that there is a comparatively large central cavity formed within the collar and between the ends of the sleeves and this cavity is utilized as an oil well entered through an oil duct 45, the outer end of the duct being fitted with a conventional type of oil plug 46. The oil will effectively lubricate all parts as it is free to pass between the shaft and the sleeves to the bearings as will be readily apparent. To the inner faces of the side bars, I secure dust guards 47 which overlie the tapering flanges of the sleeves and are shaped complementary to the sleeves.

At the opposite sides of the disc I locate similar scrapers 48, each scraper embodying an angularly disposed scraping blade 49 pivotally connected by a bolt 50 to an attaching plate 51, the attaching plate being fastened to the side bar by a bolt 52. The latter bolt is also utilized to hold the lower end of a flat upwardly extending spring 53, the upper end of which is slidably held to the scraper blade by a strap 53' attached to the blade.

In order to gauge the depth of the furrow, I have provided the device with a foot 54 which embodies a pair of rearwardly extending spaced skids 55 which span both the disc and the shoe and have their forward ends bolted to a front plate 56 which is fitted with two upstanding lugs 57 and 58 which pass to the inner sides of the draw bars in advance of the head 8 and are pivotally attached to the draw bars by bolts 59. The rear sides of the lugs are tapered and are engaged by a vertically disposed adjusting plate 60, the plate being provided with a vertical slot 61 and with rear webs 62 which are received slidably in vertical grooves 63 cut in the forward face of the head. The head carries a centrally located bolt 64 which passes through the plate and obviously this arrangement permits me to adjust the vertical position of the plate and accordingly limit the upward swinging movement of the foot, such being due to the lower edge of the plate being in contact with the lugs.

The head carries also a pair of vertically disposed adjusting bolts 65 which have their lower ends passing through the front plate of the foot and provided there under with heads and their upper ends fitted with nuts for adjusting purposes. Obviously these latter bolts limit the down swinging movement of the foot and accordingly by manipulating the adjusting plate and the latter bolts, I can swing the foot to a selected position and lock it against movement in such position.

The skids of the foot are curved so that they ride freely over the ground and will not gather weeds and so forth, and they are also made so that there is an equal depth of the shoe and the disc exposed there below with the result that the disc cuts the ground to the same depth as that entered by the shoe. By adjusting the foot which actually rides the ground and supports the attachment thereon, I can positively determine the depth of the furrow made and accordingly the depth at which the seed is sown in the soil.

I might here point out that the disc is held in a vertical position at right angles to the direction of travel of the attachment so that it cuts the ground freely and causes no side draft so that the bearings thereof are not subjected to undue wear or strain, nor is the cutting blade of the disc unevenly worn as it can rotate freely at all times.

The seed sown by the shoe is covered by working the soil back into the furrow and this can be done in a variety of ways such as by drag chains as now employed on existing machines or by shares as herein shown. These shares are in the form of angularly disposed gathering plates 66 converging rearwardly behind the shoe and positioned in staggered relation, each plate being independently pivotally attached to the boot by an arm 67 having its rear end permanently secured to the plate and its front end pivotally attached to the boot by a pivot bolt 68. I have found that this arrangement of shares effectively handles the earth to fill the furrow and as each share is independently swivelled, it is free to ride the encountered irregularities in the ground surface.

It is customary in seeding machines to press the draft bars downwardly towards the ground, such being accomplished by pressure rods provided. In existing machine structures, these pressure rods are some times disposed forwardly and some times rearwardly in respect to the draft bars and accordingly I have herein shown two arrangements of pressure rods, one being the forward type and the other the rear.

In the principal views of the drawing, a forwardly disposed pressure rod 69 is shown, this rod having the lower end thereof pivotally connected by a pivot bolt 70 to a pair of lugs 71 carried centrally by the head 8. In the modified form and as shown in Figure 12, the pressure rod 72 has the lower end thereof forked and the forked extremities are attached by bolts (not shown) to the side bars, the bolt holes being indicated in the side bars at 73. The pressure springs and other parts customarily associated with the rods are not herein shown as it is believed anyone familiar with the conventional arrangement will fully understand their action and arrangement.

The attachment herein shown will be designed so that it can be attached to the conventional type of seeding machine without requiring to alter the existing frame structure thereof or the grain tubes leading from the seed box.

In Figure 11 I have shown an alternative form of foot and which is associated with the disc alone. The said foot is provided with shorter skids 55ª than those of the foot previously described and has the forward ends of the skids permanently connected to a plate 74, the plate 74 taking the place of the plate 60 and being adjustably attached to the head by the bolt 64 which is retained. In this way, the shorter shoe can be adjusted vertically to control the depth of cut of the disc and accordingly the depth at which the seeds will be sown in the furrow made by the disc.

I am aware that seeding machines are made with discs which form the furrow but these discs are set at an angle to the direction of travel of the machine and accordingly cause considerable side draft and the side thrust brought on the discs is in time damaging to the disc bearings so that in practice through loosening or wear in the bearings, the discs cease to rotate with the result that they only last a comparatively short period. In my case, however, the discs are retained in a vertical position at right angles to the direction of draft so that they are not susceptible to any side thrusts and accordingly there is not the wear and tear on the bearing nor on the disc itself. My disc can be relied on to rotate at all times so that it will last indefinitely and will insure that the furrow is always easily and effectively cut in the soil.

Whilst the foot controls the depth at which the disc and shoe enter the ground, it also performs a further function, that is to say, it packs the soil at the side of the furrow and in this connection I might also mention that the disc operates to pack the soil as well as open the same to form the furrow. This packing of the soil in this way is very desirable as the sown seed is given a firm seed bed.

What I claim as my invention is:—

1. In an attachment to seeding machines, the combination with draw bars, of a pair of rearwardly extending spaced side bars secured to the rear ends of the draw bars, a soil cutting and furrow forming disc rotatably mounted between the side bars, a shoe located to the rear of the disc and pivotally carried by the side bars and adapted to enter the furrow formed by the disc, means for applying a downward pressure on the shoe, means for feeding the seed into the furrow through the rear end of the shoe, means for closing the furrow rearwardly of the shoe, said means being carried by the side bars and means carried by the side bars for packing the soil at the sides of the furrow formed by the disc.

2. In an atachment to seeding machines, the combination with draw bars, of a pair of rearwardly extending spaced side bars secured to the rear ends of the draw bars, a soil cutting and furrow forming disc rotatably mounted between the side bars, a shoe pivotally carried by the side bars to the rear of the disc and operating in the furrow, an adjustable spring actuated means for pressing the shoe groundward, a tubular boot secured to the shoe and through which the seed is fed into the furrow to the rear of the shoe, means for closing the furrow to the rear of the shoe to cover the deposited seeds and means carried by the side bars and riding the ground to pack the soil at the sides of the furrow.

3. In an atachment to seeding machines, the combination with draw bars, of a pair of rearwardly extending spaced side bars secured to the rear ends of the draw bars, a soil cutting and furrow forming disc rotatably mounted between the side bars, a shoe pivotally attached to the side bars and located to the rear of the disc and operating in the furrow, said shoe having the under side thereof inclining forwardly and upwardly and the rear end thereof provided with a vertically extending feed channel, a boot permanently secured to the shoe and having a seed feed passage therethrough, the lower end of which comunicates with the feed channel of the shoe, a bail bar carried by the side bars, an adjusting bolt pivotally secured to the shoe and extending upwardly through the bail bar and provided with an adjusting nut, a pressure spring mounted on the bolt between the shoe and the bail bar, means secured to the rear ends of the side bars and operating on the ground to close the furrow rearwardly of the shoe and a foot adjustably secured to the side bar in advance of the disc and presenting rearwardly extending, ground engaging skids passing to the sides of the disc.

Signed at Winnipeg this 16th day of March, 1927.

LOUIS NAGY.